(12) United States Patent
Doi (10) Patent No.: US 12,351,178 B2
(45) Date of Patent: Jul. 8, 2025

(54) DRIVING ASSISTANCE DEVICE, DRIVING ASSISTANCE METHOD, AND DRIVING ASSISTANCE PROGRAM

(71) Applicant: TOYOTA JIDOSHA KABUSHIKI KAISHA, Toyota (JP)

(72) Inventor: Tomoyuki Doi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 329 days.

(21) Appl. No.: 18/130,273

(22) Filed: Apr. 3, 2023

(65) Prior Publication Data
US 2023/0311885 A1     Oct. 5, 2023

(30) Foreign Application Priority Data

Apr. 5, 2022  (JP) ................................ 2022-062865

(51) Int. Cl.
*B60W 30/18* (2012.01)
*B60W 40/105* (2012.01)
*G06V 20/58* (2022.01)

(52) U.S. Cl.
CPC .... *B60W 30/18154* (2013.01); *B60W 40/105* (2013.01); *G06V 20/584* (2022.01); *B60W 2420/403* (2013.01)

(58) Field of Classification Search
CPC ..... B60W 30/18154; B60W 30/18109; B60W 30/18063; B60W 30/181; B60W 40/105; B60W 2420/403; B60W 50/0097; B60W 2555/60; B60W 2720/10; G06V 20/584; G08G 1/096725; G08G 1/096783

USPC .......................................................... 701/70
See application file for complete search history.

(56) References Cited

U.S. PATENT DOCUMENTS

| | | | |
|---|---|---|---|
| 8,355,851 B2 | 1/2013 | Inoue et al. | |
| 8,370,040 B2 | 2/2013 | Inoue et al. | |
| 8,417,430 B2 | 4/2013 | Saeki | |
| 8,548,709 B2 | 10/2013 | Morita | |

(Continued)

FOREIGN PATENT DOCUMENTS

JP      2021-77012 A      5/2021

*Primary Examiner* — Hai H Huynh
(74) *Attorney, Agent, or Firm* — Sughrue Mion, PLLC (57) ABSTRACT

Provided is a driving assistance device (1) including: a traffic light recognition device configured to recognize a lighting mode of a traffic light existing in front of an own vehicle; and a control device configured to determine a predetermined position in a periphery of the traffic light as a target position, execute deceleration control of decelerating the own vehicle until the own vehicle reaches the target position, calculate a predicted speed being a speed of the own vehicle at a time point at which the own vehicle reaches the target position in a case in which the own vehicle is decelerated from a current time point in a predetermined deceleration mode, execute the deceleration control in a first situation in which the predicted speed is equal to or lower than a threshold value determined based on the lighting mode of the traffic light, and to avoid executing the deceleration control in a second situation in which the predicted speed is higher than the threshold value. The threshold value at a time when a light color of the traffic light is yellow is smaller than the threshold value at a time when the light color of the traffic light is red.

8 Claims, 9 Drawing Sheets

(56) References Cited

U.S. PATENT DOCUMENTS

| | | |
|---|---|---|
| 8,768,597 B2 | 7/2014 | Kagawa |
| 9,174,643 B2 | 11/2015 | Aso |
| 10,017,178 B2 | 7/2018 | Morimoto et al. |
| 10,118,617 B2 | 11/2018 | Urano et al. |
| 10,486,698 B2 | 11/2019 | Masui et al. |
| 10,922,561 B2 * | 2/2021 | Ozawa ................ G05D 1/0246 |
| 11,507,833 B2 * | 11/2022 | Koike .................... G06N 3/084 |
| 2014/0285331 A1 | 9/2014 | Otake |
| 2019/0295419 A1 | 9/2019 | Tosa et al. |
| 2021/0139034 A1 | 5/2021 | Otake |

* cited by examiner

| RECOGNITION RESULT OF TRAFFIC LIGHT S | | | LIKELIHOOD |
|---|---|---|---|
| THREE-COLOR LAMP DEVICE | ARROW LAMP DEVICE | | |
| | INSTALLED/ NOT INSTALLED | TRAVELING PERMISSION/INHIBITION | |
| RED OR YELLOW | NOT INSTALLED | — | H2 |
| | INSTALLED | STRAIGHT TRAVELING IS INHIBITED | H1 |
| | UNKNOWN | — | M |
| | INSTALLED | PERMITTED/INHIBITED TRAVELING DIRECTION IS UNKNOWN | L |

| CORRECTION VALUE |
|---|
| $-\alpha$ |

+

| SITUATION | CORRECTION VALUE |
|---|---|
| TURN SIGNAL INDICATION AND TRAVELING LANE CLASSIFICATION MATCH | $+\beta$ |
| OWN VEHICLE IS POSITIONED AT LEFT END OR RIGHT END (SAME END PORTION AS TURN SIGNAL INDICATION) OF TRAVELING LANE | $+\beta$ |

| THREE-COLOR LAMP DEVICE | ARROW LAMP DEVICE | | POSITION OF OWN VEHICLE | LIKELIHOOD |
|---|---|---|---|---|
| | INSTALLED/NOT INSTALLED | TRAVELING PERMISSION/INHIBITION | | |
| RED | NOT INSTALLED | — | — | a |
| RED | INSTALLED | STRAIGHT TRAVELING IS INHIBITED | — | b |
| RED | UNKNOWN | — | — | c |
| RED | INSTALLED | PERMITTED/INHIBITED TRAVELING DIRECTION IS UNKNOWN | — | d |
| YELLOW | NOT INSTALLED | — | MATCHES TURN SIGNAL INDICATION | e |
| YELLOW | NOT INSTALLED | — | DOES NOT MATCH TURN SIGNAL INDICATION | f |
| YELLOW | INSTALLED | STRAIGHT TRAVELING IS INHIBITED | MATCHES TURN SIGNAL INDICATION | g |
| YELLOW | INSTALLED | STRAIGHT TRAVELING IS INHIBITED | DOES NOT MATCH TURN SIGNAL INDICATION | h |
| YELLOW | UNKNOWN | — | MATCHES TURN SIGNAL INDICATION | i |
| YELLOW | UNKNOWN | — | DOES NOT MATCH TURN SIGNAL INDICATION | j |
| YELLOW | INSTALLED | PERMITTED/INHIBITED TRAVELING DIRECTION IS UNKNOWN | MATCHES TURN SIGNAL INDICATION | k |
| YELLOW | INSTALLED | PERMITTED/INHIBITED TRAVELING DIRECTION IS UNKNOWN | DOES NOT MATCH TURN SIGNAL INDICATION | l |

FIG.9

DRIVING ASSISTANCE DEVICE, DRIVING ASSISTANCE METHOD, AND DRIVING ASSISTANCE PROGRAM

BACKGROUND OF THE INVENTION

1. Field of the Invention

The present invention relates to a driving assistance device which is mounted to an own vehicle, and recognizes a lighting mode of a traffic light and decelerates the own vehicle based on a result of the recognition, and a driving assistance method, and a driving assistance program.

2. Description of the Related Art

There has been known a driving assistance device (hereinafter referred to as "related-art device") which is mounted to an own vehicle, and recognizes a lighting mode of a traffic light and decelerates the own vehicle based on a result of the recognition (see, for example, Japanese Patent Application Laid-open No. 2021-77012). This related-art device recognizes the lighting mode (light color) of a traffic light in front of the own vehicle based on an image acquired from an in-vehicle camera. After that, the related-art device determines whether or not a driver of the own vehicle is executing a driving operation of accelerating the own vehicle based on an operation mode of an accelerator pedal of the driver. Then, the related-art device predicts (calculates) a speed of the own vehicle at a target position (position before the traffic light) when it is determined that "the driver is not executing the driving operation of accelerating the own vehicle," and when the lighting mode of the traffic light is "red or yellow." When a result of the prediction is equal to or lower than a threshold value, the related-art device executes the control of decelerating the own vehicle (deceleration control).

When the light color of the traffic light has changed to "yellow" under a state in which the own vehicle is positioned before the traffic light, the driver may not be able to determine whether to decelerate the own vehicle to stop before the traffic light, or to accelerate the own vehicle to pass the traffic light. This state is generally referred to as "dilemma zone." The related-art device does not distinguish the state in which the light color of the traffic light is "red" and the state in which the light color thereof is "yellow." Thus, the related-art device tends to execute the deceleration control to stop the own vehicle even when the light color is "yellow." As a result, the deceleration control is highly likely to be started before the driver determines a mode of the driving operation in the dilemma zone. For example, there is a case in which the above-mentioned deceleration control has already been started at a time point at which the driver selects to pass (to travel straight, to turn right, or to turn left) the traffic light at an intersection, and hence the speed of the own vehicle has decreased. In this case, even when the own vehicle is accelerated from that time point, there is a fear in that the light color of the traffic light may turn to "red" immediately before the intersection or in the intersection.

SUMMARY OF THE INVENTION

One object of the present invention is to provide a driving assistance device which suppresses execution of excessive deceleration control in a dilemma zone.

In order to solve the above-mentioned problem, a driving assistance device (1) according to at least one embodiment of the present invention is mounted to an own vehicle.

The driving assistance device includes: a traffic light recognition device (23) configured to recognize a lighting mode of a traffic light (S) existing in front of the own vehicle; and a control device (10) configured to determine a predetermined position in a periphery of the traffic light as a target position (sp) when the lighting mode of the traffic light recognized by the traffic light recognition device is a predetermined mode, execute deceleration control of decelerating the own vehicle until the own vehicle reaches the target position, calculate a predicted speed (vp) being a speed of the own vehicle at a time point at which the own vehicle reaches the target position in a case in which the own vehicle is decelerated from a current time point in a predetermined deceleration mode, execute the deceleration control in a first situation in which the predicted speed is lower than a threshold value (vpth) determined based on the lighting mode of the traffic light, and to perform one of avoiding executing the deceleration control or executing slow deceleration control of decelerating the own vehicle more slowly than in the first situation in a second situation in which the predicted speed is equal to or higher than the threshold value. The threshold value at a time when a light color of the traffic light is yellow is smaller than the threshold value at a time when the light color of the traffic light is red In the at least one embodiment of the present invention, the control device sets the threshold value such that the threshold value at the time when the light color of the traffic light is "yellow" is smaller than the threshold value at the time when the light color of the traffic light is "red." Thus, the state in which the predicted speed is higher than the threshold value tends to be more likely to occur when the light color is "yellow" than when the light color is "red." That is, the deceleration control is less likely to be executed when the light color is "yellow" than when the light color is "red." Thus, according to the at least one embodiment of the present invention, it is possible to suppress the excessive execution of the deceleration control in the dilemma zone.

In the driving assistance device according to one aspect of the present invention, the control device is configured to increase the threshold value as an elapsed time since the traffic light recognition device recognizes that the light color is yellow increases.

According to this aspect, when a certain time has elapsed since the predicted speed exceeded the threshold value, the threshold value has increased, and hence a possibility that the state transitions to the state in which the predicted speed is equal to or lower than the threshold value can be increased. For example, the predicted speed is equal to or higher than the threshold value at a time point at which the control device recognizes that the light color is "yellow," and hence the control device does not execute the deceleration control. However, the threshold value increases as the time elapses, and hence the predicted speed falls below the threshold value immediately before the light color transitions to "red." Thus, the control device starts the deceleration control. As a result, safety of the own vehicle can be increased.

In the driving assistance device according to another aspect of the present invention, the control device is configured to increase the threshold value when the light color of the traffic light is yellow, a direction indicator of the own vehicle is operating, and the own vehicle has entered a dedicated lane for turning toward a direction indicated by the direction indicator.

According to this aspect, when the direction indicator indicates a "right turn" ("left turn"), and the own vehicle is positioned on a right turn lane (left turn lane), the control device increases the threshold value. Thus, in this case, the predicted speed tends to be equal to or lower than the threshold value. As a result, it is possible to decelerate the own vehicle to safely turn the own vehicle right (left).

In the driving assistance device according to still another aspect of the present invention, the control device is configured to increase the threshold value when the light color of the traffic light is yellow, a direction indicator of the own vehicle is operating, and the own vehicle is positioned in, of both end portions in a width direction of a road on which the own vehicle is traveling, an end portion which is located in a direction indicated by the direction indicator.

According to this aspect, the threshold value is increased when the direction indicator is indicating the "right turn" ("left turn"), and the own vehicle is positioned at the right end (left end) of the road. Thus, the predicted speed tends to become equal to or lower than the threshold value. As a result, it is possible to decelerate the own vehicle to safely turn the own vehicle right (left).

Moreover, a driving assistance method and a driving assistance program according to at least one embodiment of the present invention include steps executed by each device forming the above-mentioned driving assistance device. According to the at least one embodiment of the present invention, it is possible to suppress the excessive execution of the deceleration control in the dilemma zone.

DESCRIPTION OF THE EMBODIMENTS (Overview of Configuration)

Figure 1:
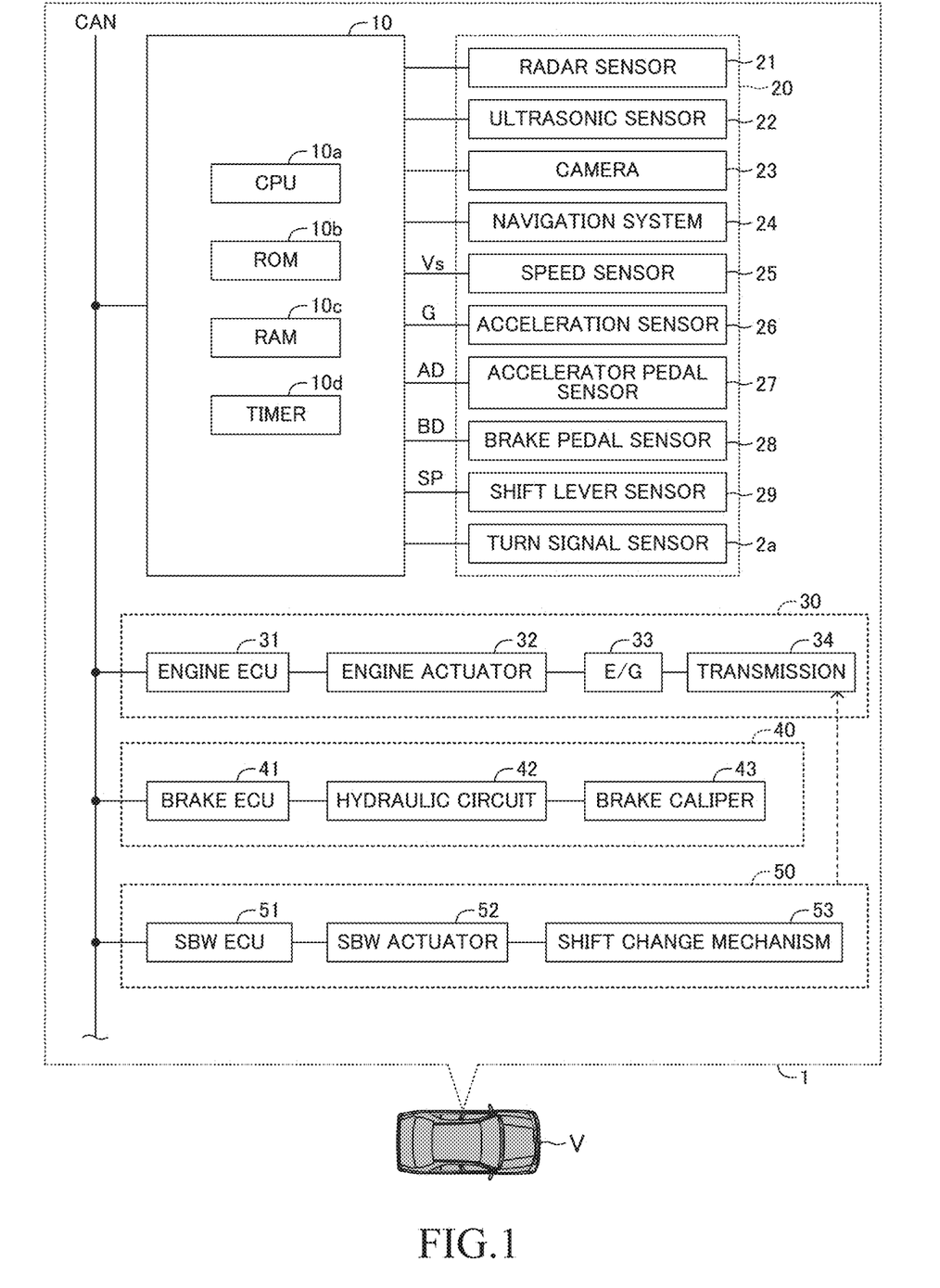
FIG. 1 is a block diagram of a driving assistance device according to at least one embodiment of the present invention.

As illustrated in FIG. 1, a driving assistance device 1 according to at least one embodiment of the present invention is mounted to a vehicle V. As described in detail later, the driving assistance device 1 can execute deceleration control of decelerating the vehicle V by controlling a drive device, a braking device, and the like of the vehicle V in accordance with lighting modes of a traffic light S. The vehicle to which the driving assistance device 1 is mounted is sometimes referred to as "own vehicle" in order to distinguish this vehicle from other vehicles.

(Specific Configuration)

As illustrated in FIG. 1, the driving assistance device 1 includes a driving assistance ECU 10, in-vehicle sensors 20, a drive device 30, a braking device 40, and a shift switching device 50.

The driving assistance ECU 10 includes a microcomputer including, for example, a CPU 10a, a ROM 10b, a RAM 10c, and a timer 10d. As used herein, "ECU" means an electronic control unit, and the ECU includes a microcomputer including, for example, a CPU, a RAM, and a ROM. The CPU implements various functions by executing instructions stored in the ROM.

The driving assistance ECU 10 is connected to other ECUs (engine ECU 31, brake ECU 41, and SBW ECU 51 described later) via a controller area network (CAN) in a manner that enables information to be transmitted and received to and from each other.

The in-vehicle sensors 20 include sensors which acquire vehicle peripheral information including information on three-dimensional objects present around the vehicle V and information on separation lines of a road surface around the vehicle V. That is, the in-vehicle sensors 20 include sensors which acquire information relating to, for example, moving objects, such as an automobile (another vehicle), a pedestrian, or a bicycle, and fixed objects, such as a white line on the road surface, a guardrail, or a traffic light.

Specifically, the in-vehicle sensors 20 include a radar sensor 21, an ultrasonic sensor 22, a camera 23, and a navigation system 24.

The radar sensor 21 includes a radar transmitting/receiving unit and a signal processing unit (which are not shown). The radar transmitting/receiving unit radiates radio waves in the millimeter wave band (hereinafter referred to as "millimeter waves") into an area around the vehicle, and receives the millimeter waves reflected by a three-dimensional object present within a radiation range (that is, reflected waves). The signal processing unit acquires information representing, for example, a distance between the vehicle V and the three-dimensional object, a relative speed between the vehicle V and the three-dimensional object, and a relative position (direction) of the three-dimensional object with respect to the vehicle V based on, for example, a phase difference between the transmitted millimeter waves and the received reflected waves, an attenuation level of the reflected waves, and a period of time from the transmission of the millimeter waves to the reception of the reflected waves, and transmits the acquired information to the driving assistance ECU 10.

The ultrasonic sensor 22 transmits ultrasonic waves in pulses into a predetermined range around the vehicle, and receives the reflected waves reflected by the three-dimensional object. The ultrasonic sensor acquires information representing, for example, a "reflection point, which is a point on the three-dimensional object from which the transmitted ultrasonic waves are reflected," and a "distance between the ultrasonic sensor and the three-dimensional object" based on the period of time from the transmission of the ultrasonic waves to the reception of the reflected waves, and transmits the acquired information to the driving assistance ECU 10.

The camera 23 includes an image pickup device and an image analysis device. The image pickup device is, for example, a digital camera having a built-in image pickup element being a charge-coupled device (CCD) or a CMOS image sensor (CIS). The image pickup device is arranged on an upper part of a front windshield glass. The image pickup device outputs image data obtained by photographing the foreground of the vehicle at a predetermined frame rate to the image analysis device. The image analysis device analyzes the obtained image data, acquires information relating to a target positioned in front of the vehicle V from the image, and transmits the acquired information to the driving assistance ECU 10. For example, the image analysis device attempts to recognize the lighting modes (a light color of a three-color lamp device and on/off of an arrow lamp device indicating a permitted traveling direction) of the closest traffic light S positioned in front in a traveling direction of the vehicle V. When the lighting modes of the traffic light S have successfully been recognized, the image analysis device transmits data indicating the lighting modes as traffic light recognition data to the driving assistance ECU 10. When the lighting modes of the traffic light S have not successfully been recognized, the image analysis device transmits data indicating "unrecognizable" as the traffic light recognition data to the driving assistance ECU 10. Moreover, the image analysis device recognizes a traveling lane classification (for example, a right turn lane and a left turn lane) of a lane on which the own vehicle is traveling based on an image of white lines (separation line and stop line) on a road and the like, and transmits information indicating a result of the recognition to the driving assistance ECU 10.

The navigation system 24 receives GPS signals from a plurality of satellites, and detects a current position (latitude and longitude) of the vehicle V based on the plurality of received GPS signals. Further, the navigation system 24 stores map data representing a map. The map data includes road information indicating roads and traffic light position information indicating installation positions of traffic lights. The navigation system 24 transmits vehicle position information indicating the detected current position to the driving assistance ECU 10. Further, the navigation system 24 has a function of calculating a distance between two positions (distance along a road). For example, the navigation system 24 can calculate a distance L from the current position of the vehicle V to a traffic light S (closest traffic light) which the vehicle V first passes when the vehicle V travels straight along the lane on which the vehicle V is currently traveling, and can transmit this distance data to the driving assistance ECU 10.

The in-vehicle sensors 20 also include a sensor which acquires information relating to a travel state of the vehicle V (such as speed, acceleration, and operation mode of an operating element).

Specifically, the in-vehicle sensors 20 include a speed sensor 25, an acceleration sensor 26, an accelerator pedal sensor 27, a brake pedal sensor 28, and a shift lever sensor 29.

The speed sensor 25 includes a wheel speed sensor which generates one pulse signal (wheel pulse signal) each time a wheel of the own vehicle rotates by a predetermined angle. The speed sensor 25 measures the number of pulses of the wheel pulse signal transmitted from the wheel speed sensor in unit time, calculates a rotation speed (wheel speed) of each wheel based on the measured number of pulses, and calculates a speed vs (actual vehicle speed) of the own vehicle based on the wheel speed of each wheel. The speed sensor 25 transmits data representing the speed vs to the driving assistance ECU 10.

The acceleration sensor 26 detects an acceleration Ga acting on the vehicle V (for example, an acceleration acting in a width direction of the vehicle V when the vehicle V is traveling on a curved road, and an acceleration acting in a longitudinal direction of the vehicle V when the vehicle V is traveling on a straight road). The acceleration sensor 26 transmits data representing the acceleration Ga to the driving assistance ECU 10.

The accelerator pedal sensor 27 detects a depression depth AD of an accelerator pedal (not shown) of the vehicle V. The accelerator pedal sensor 27 transmits data representing the depression depth AD of the accelerator pedal to the driving assistance ECU 10.

The brake pedal sensor 28 detects a depression depth BD of a brake pedal (not shown) of the vehicle V. The brake pedal sensor 28 transmits data representing the depression depth BD of the brake pedal to the driving assistance ECU 10.

The shift lever sensor 29 detects a position (shift lever position SP) of a shift lever (not shown) of the vehicle V. The shift lever sensor 29 transmits data representing the shift lever position SP to the driving assistance ECU 10.

The in-vehicle sensors 20 also include various switches (for example, a switch for detecting an operation state of a direction indicator operating lever (turn signal sensor 2a)) included in the vehicle V.

The drive device 30 generates a driving force, and applies the driving force to drive wheels out of wheels (left front wheel, right front wheel, left rear wheel, and right rear wheel). The drive device 30 includes, for example, the engine ECU 31, an engine actuator 32, an internal combustion engine 33, a transmission 34, and a driving force transmission mechanism (not shown) which transmits a driving force to the wheels. The engine ECU 31 is connected to the engine actuator 32. The engine actuator 32 includes a throttle valve actuator which changes an opening degree of a throttle valve of the internal combustion engine 33. The engine ECU 31 acquires the depression depth AD of the accelerator pedal from the driving assistance ECU 10. The driving assistance ECU 10 can appropriately correct the depression depth AD acquired from the accelerator pedal sensor 27, and transmit the corrected depression depth AD to the engine ECU 31. The engine ECU 31 drives the engine actuator 32 in accordance with the depression depth AD acquired from the driving assistance ECU 10. In this way, the torque generated by the internal combustion engine 33 is controlled. The torque generated by the internal combustion engine 33 is transmitted to the drive wheels via the transmission 34 and the driving force transmission mechanism (for example, a drive shaft).

When the vehicle V to which the driving assistance device 1 is applied is a hybrid electric vehicle (HEV), the engine ECU 31 can control the driving force of the vehicle generated by any one or both of "an internal combustion engine and an electric motor" serving as a vehicle drive source. Further, when the vehicle V to which the driving assistance device 1 is applied is a battery electric vehicle (BEV), an electric motor ECU which controls the driving force of the vehicle generated by an "electric motor" serving as the vehicle drive source may be used instead of the engine ECU 31.

The braking device 40 applies a braking force to the wheels. The braking device 40 includes the brake ECU 41, a hydraulic circuit 42, and a brake caliper 43. The hydraulic circuit 42 includes, for example, a reservoir, an oil pump, various valve devices, and a hydraulic sensor (which are not shown). The brake caliper 43 is a hydraulic actuator including a cylinder and a piston. When oil is supplied to the cylinder, the piston is pushed out of the cylinder. A brake pad is arranged at the tip of the piston, and the brake pad is pressed against a brake disc, to thereby increase a brake pressure. The brake ECU 41 acquires the depression depth BD of the brake pedal from the driving assistance ECU 10. The driving assistance ECU 10 can appropriately correct the depression depth BD acquired from the brake pedal sensor 28, and transmit the corrected depression depth BD to the brake ECU 41. The brake ECU 41 transmits a hydraulic pressure control command to the hydraulic circuit 42 in accordance with the depression depth BD acquired from the driving assistance ECU 10. The hydraulic circuit 42 adjusts the hydraulic pressure in the cylinder of the brake caliper 43 in accordance with the hydraulic pressure control command acquired from the brake ECU 41. In this way, the braking force of the wheels (brake discs) by the brake caliper 43 is controlled.

The shift switching device 50 switches a shift position of the transmission 34. The shift switching device 50 includes, for example, the shift-by-wire (SBW) ECU 51, an SBW actuator 52, and a shift switching mechanism 53. The SBW ECU 51 is connected to the SBW actuator 52. The SBW ECU 51 acquires the shift lever position SP from the driving assistance ECU 10. The driving assistance ECU 10 can appropriately correct the shift lever position SP acquired from the shift lever sensor 29, and transmit the corrected shift lever position SP to the SBW ECU 51. The SBW ECU 51 transmits a shift switching command to the SBW actuator 52 in accordance with the shift lever position SP acquired from the driving assistance ECU 10. The SBW actuator 52 controls the shift switching mechanism 53 in accordance with the shift switching command acquired from the SBW ECU 51. In this way, the shift position of the transmission 34 is switched.

(Operation)

The driving assistance ECU 10 determines whether or not to execute the deceleration control (deceleration assistance) of decelerating the own vehicle in accordance with a situation as described below.

<Deceleration Control>

The driving assistance ECU 10 sequentially acquires traffic light recognition data from the camera 23. The driving assistance ECU 10 does not execute the deceleration control (deceleration assistance) when the driving assistance ECU 10 recognizes that the light color (light color of a three-color lamp device) being one of the lighting modes of the traffic light S indicated by the traffic light recognition data is "green" or when the light color of the traffic light S is not known.

Meanwhile, the driving assistance ECU 10 determines whether or not to execute the deceleration control as described below when the driving assistance ECU 10 recognizes that the light color of the traffic light S indicated by the traffic light recognition data is "yellow or red."

The following situation A can be considered as a situation in which the driver is trying to decelerate the own vehicle.

(Situation A) The depression depth BD of a brake pedal is increasing.

Meanwhile, the following situation B can be considered as a situation in which the driver is trying to accelerate the own vehicle.

(Situation B) The depression depth AD of the accelerator pedal is increasing or is a constant value larger than "0."

Another situation C (for example, a situation in which the depression depth AD and the depression depth BD are "0") can be considered as a situation in which whether the driver is trying to accelerate or to decelerate the own vehicle is not known.

The driving assistance ECU 10 sequentially acquires the depression depths of the accelerator pedal and the brake pedal, to thereby detect changes therein. After that, the driving assistance ECU 10 determines, based on a result of the detection, which of the situation A to the situation C the current situation corresponds to.

When the current situation corresponds to the situation A or the situation C, the driving assistance ECU 10 acquires, from the navigation system 24, the distance LS to the traffic light S. After that, the driving assistance ECU 10 determines, as a target position sp, a position at which the traffic light S is installed (for example, a position of a stop line before the traffic light S). After that, the driving assistance ECU 10 acquires a current speed vs of the own vehicle from the speed sensor 25. After that, the driving assistance ECU 10 calculates a speed (hereinafter referred to as "predicted speed vp") of the own vehicle at the time point at which the own vehicle reaches the target position sp in a case in which the own vehicle is decelerated from the current speed vs at a predetermined deceleration "a" (acceleration (constant value) in an opposite direction of the traveling direction of the own vehicle).

Figure 2:
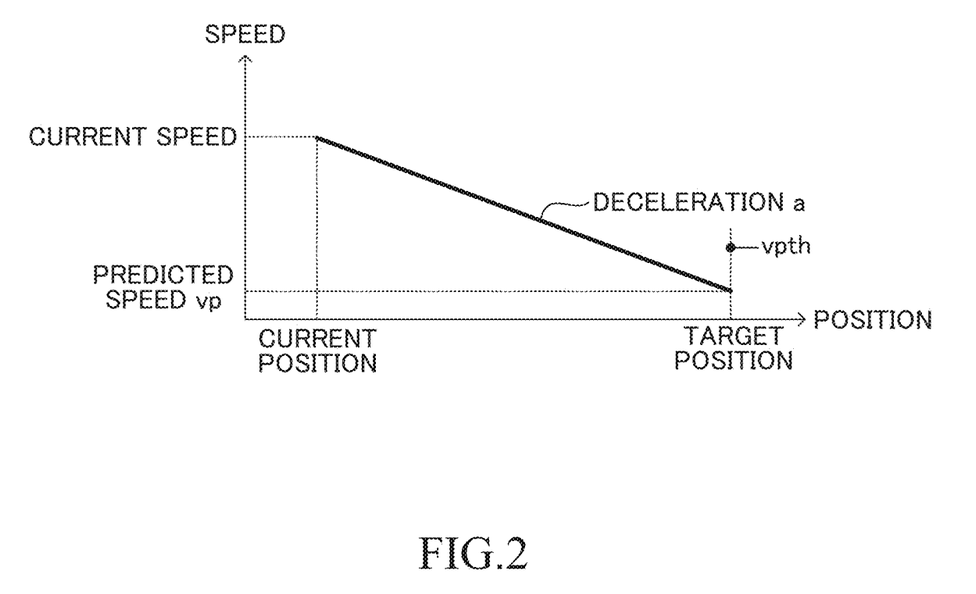
FIG. 2 is a graph for showing an example of a magnitude relationship between a predicted speed and a threshold value.

When the predicted speed vp is lower than a threshold value vpth described later (see FIG. 2), the driving assistance ECU 10 executes the deceleration control. That is, the driving assistance ECU 10 controls the drive device 30, the braking device 40, and the shift switching device 50 (hereinafter referred to as "drive device and the like") such that the deceleration matches a predetermined value, to thereby decelerate the own vehicle. The deceleration in this deceleration control may be the same as or different from the deceleration "a" used to calculate the predicted speed vp. Moreover, when the predicted speed vp is equal to or higher than the threshold value vpth, the driving assistance ECU 10 does not execute the deceleration control.

The threshold value vpth is determined based on a likelihood (hereinafter referred to as "likelihood LH") for decelerating the own vehicle from the current position. The likelihood LH is determined based on a database DB which is set in advance and in which the likelihood LH is associated with the lighting modes of the traffic light S, the position (traveling lane classification or a position on the traveling lane in a width direction) of the own vehicle, and the like. This database DB is stored in the ROM 10b.

Figure 3A:
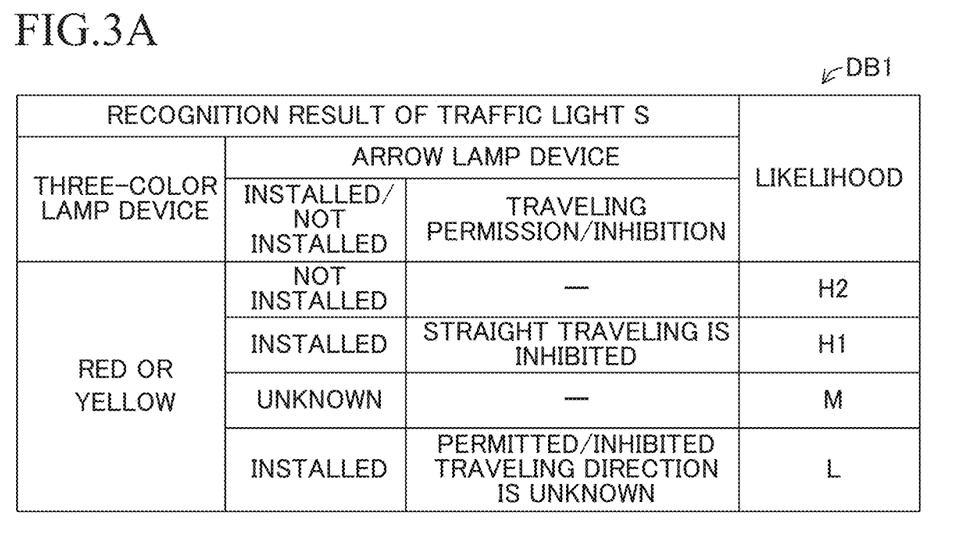
FIG. 3A is a table for showing a first database.
Figure 3B:
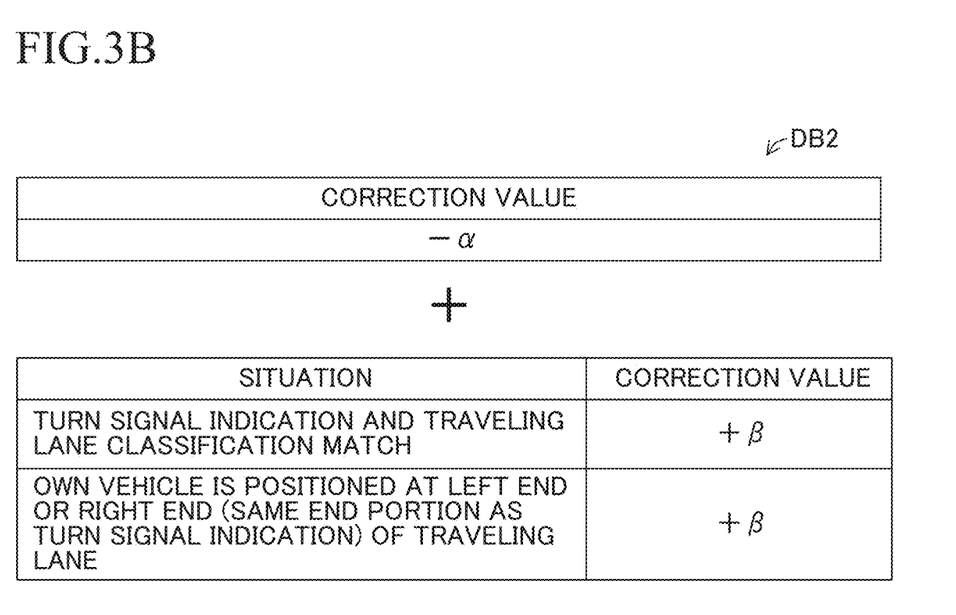
FIG. 3B is a table for showing a second database.

The database DB is formed of a first database DB1 and a second database DB2 shown in FIG. 3A and FIG. 3B, respectively. The first database DB1 is the same as a database of the above-mentioned related-art device. The second database DB2 is used when the light color of the traffic light S is "yellow."

The driving assistance ECU 10 first refers to the first database DB1, to thereby preliminarily determine the likelihood LH corresponding to the lighting modes of the traffic light S.

After that, when the light color of the traffic light S is "yellow," the driving assistance ECU 10 corrects the likelihood LH preliminarily determined as described above in accordance with the second database DB2. When the light color of the traffic light S is "red," the driving assistance ECU 10 does not correct the likelihood LH. That is, the driving assistance ECU 10 uses the preliminarily determined likelihood LH to calculate the threshold value vpth.

For example, when the light color of the traffic light S is "yellow," and an arrow lamp device is not installed, the likelihood LH is first set to (preliminarily determined as) "H2" in accordance with the first database DB1. After that, "α" is subtracted from the likelihood LH ("−α" is added to the likelihood LH) in accordance with the second database DB2. That is, in this case, the likelihood LH is first preliminarily determined as "H2," and is then corrected to "H2−α." Further, for example, when an indication mode of a direction indicator (turn signal) and a traveling lane of the own vehicle match each other (for example, when the direction indicator indicates the left direction, and the own vehicle is positioned on a left turn lane), or when the own vehicle is positioned in an end portion of the traveling lane in the width direction on the side indicated by the direction indicator (for example, when the direction indicator indicates the left direction and the own vehicle is positioned on a left end side of the lane in the width direction), the likelihood LH is corrected to "H2−α+β." In this configuration, "α" (absolute value) is larger than "β" (absolute value).

Further, the driving assistance ECU 10 gradually increases the likelihood LH as a time Δt elapsed since the light color of the traffic light S was recognized as "yellow" increases. The maximum value in the case in which the likelihood LH is increased in accordance with the time Δt is smaller than "H2."

Figure 4:
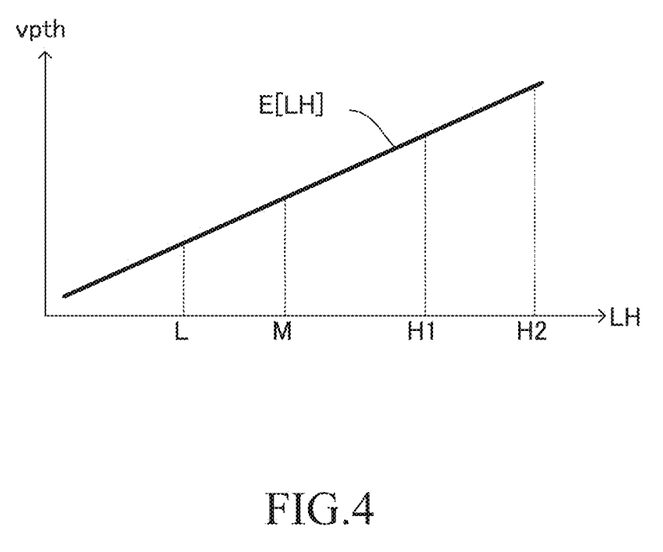
FIG. 4 is a graph for showing a calculation expression for calculating a threshold value corresponding to a likelihood determined based on FIG. 3A and FIG. 3B.

After that, the driving assistance ECU 10 applies (assigns) the likelihood LH determined based on the database DB to a predetermined calculation expression E[LH], to thereby determine the threshold value vpth. As shown in FIG. 4, the calculation expression E[LH] is determined such that the threshold value vpth increases as the likelihood LH increases.

As described above, the driving assistance ECU 10 determines the threshold value vpth such that the threshold value vpth at the time when the light color of the traffic light S is "yellow" is smaller by "α" than the threshold value vpth at the time when the light color of the traffic light S is "red." Moreover, the driving assistance ECU 10 increases the threshold value vpth determined when the light color of the traffic light S is yellow as the elapsed time since the light color was recognized as yellow increases. Further, the driving assistance ECU 10 increases the threshold value vpth by "β" when the light color of the traffic light is "yellow," the direction indicator of the own vehicle is operating, and the own vehicle has entered a dedicated lane for turning toward the direction indicated by the direction indicator. Still further, the driving assistance ECU 10 increases the threshold value vpth by "β" when the light color of the traffic light is "yellow," the direction indicator of the own vehicle is operating, and the own vehicle is positioned in, of the both end portions in the width direction of the road on which the own vehicle is traveling, an end portion which is located in the direction indicated by the direction indicator. The threshold value vpth corrected when the light color of the traffic light S is "yellow" does not exceed the threshold value vpth at the time when the light color of the traffic light S is "red."

Figure 5:
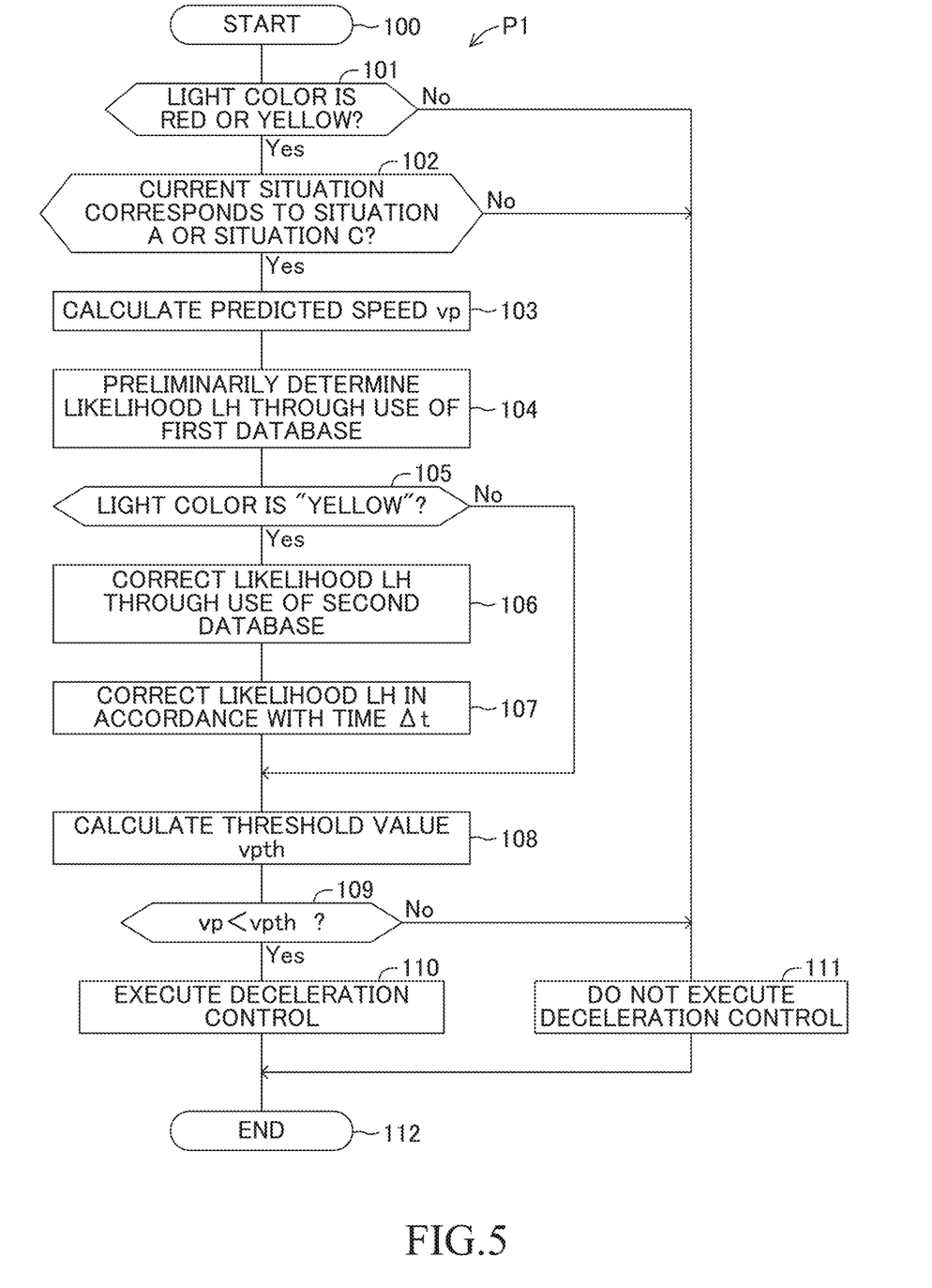
FIG. 5 is a flowchart of a program for implementing deceleration control.

With reference to FIG. 5, description is now given of an operation (program P1 for executing the deceleration control) of the CPU 10a (hereinafter simply referred to as "CPU") of the driving assistance ECU 10. The CPU sequentially acquires the traffic light recognition data from the camera 23. After that, when the traffic light recognition data indicates the lighting modes of the traffic light S, the CPU executes the program P1. Meanwhile, when the traffic light recognition data indicates that "the lighting modes of the traffic light S have not successfully been recognized", the CPU does not execute the program P1.

(Program P1)

The CPU starts executing the program P1 from Step 100, and then advances the process to Step 101.

In Step 101, the CPU determines whether or not the light color of the traffic light S is "red or yellow" based on the traffic light recognition data. When the light color of the traffic light S is "red or yellow" (Yes in Step 101), the CPU advances the process to Step 102. Meanwhile, when the light color of the traffic light S is "green" (No in Step 101), the CPU advances the process to Step 111 described later.

In Step 102, the CPU determines whether or not the current situation (situation relating to the operations of the accelerator pedal and the brake pedal) corresponds to the above-mentioned situation A or situation C. When the operation modes of the accelerator pedal and the brake pedal correspond to the above-mentioned situation A or situation C (Yes in Step 102), the CPU advances the process to Step 103. Meanwhile, when the operation modes of the accelerator pedal and the brake pedal correspond to the above-mentioned situation B (No in Step 102), the CPU advances the process to Step 111.

In Step 103, the CPU calculates the predicted speed vp. Specifically, the CPU acquires the speed vs. Moreover, the CPU determines the target position sp, and acquires the distance L from the current position to the target position sp from the navigation system 24. After that, the CPU calculates the predicted speed vp based on the speed vs, the distance L, and the deceleration "a." After that, the CPU advances the process to Step 104.

In Step 104, the CPU refers to the first database DB1 to preliminarily determine the likelihood LH based on the whether or not an arrow lamp device is installed and the traveling permission or inhibition situation, and advances the process to Step 105.

In Step 105, the CPU determines whether or not the light color of the traffic light S is "yellow." When the light color is "yellow" (Yes in Step 105), the CPU advances the process to Step 106. Meanwhile, when the light color is not "yellow" (when the light color is "red" (No in Step 105), the CPU advances the process to Step 108.

In Step 106, the CPU refers to the second database DB2 to correct the likelihood LH. Specifically, in Step 106, the CPU subtracts the correction value "α" from the likelihood LH, to thereby correct the likelihood LH. After that, the CPU determines whether or not the direction indicator is operating. When the direction indicator is operating, the CPU determines whether or not the indication mode of the direction indicator (direction indicated by the direction indicator) of the own vehicle and the traveling lane of the own vehicle match each other and whether or not the own vehicle is positioned in an end portion of the traveling lane in the width direction which is located on the direction indicated by the direction indicator. When results of the above-mentioned determinations are "Yes," the CPU adds the correction value "β" to the corrected likelihood LH, to thereby further correct the likelihood LH. After that, the CPU advances the process to Step 107.

In Step 107, the CPU adds, to the likelihood LH, the correction value corresponding to the elapsed time since the light color of the traffic light S was recognized as "yellow," to thereby further correct the likelihood LH. After that, the CPU advances the process to Step 108.

In Step 108, the CPU applies the likelihood LH to the calculation expression E, to thereby calculate the threshold value vpth. The CPU then advances the process to Step 109.

In Step 109, the CPU determines whether or not the predicted speed vp is smaller than the threshold value vpth. When the predicted speed vp is lower than the threshold value vpth (Yes in Step 109), the CPU advances the process to Step 110. Meanwhile, when the predicted speed vp is equal to or higher than the threshold value vpth (No in Step 109), the CPU advances the process to Step 111.

In Step 110, the CPU executes the deceleration control. For example, the CPU controls the braking device 40 to increase the brake pressure for a predetermined short time (time required to execute Step 110). After that, the CPU advances the process to Step 112, and finishes the execution of the program P1.

Moreover, in Step 111, the CPU advances the process to Step 112 without executing the deceleration control.

The above-mentioned program P1 is executed at a predetermined cycle (each time a predetermined short time elapses). That is, the program P1 is repeatedly executed while the own vehicle is approaching the traffic light S. Moreover, during this period, the predicted speed vp and the threshold value vpth may change in accordance with changes in the operation modes of the accelerator pedal and the brake pedal, the lighting modes of the traffic light S, and the like.

(Effects)

The CPU executes the above-mentioned program P1, to thereby execute the deceleration control when the predicted speed vp is lower than the threshold value vpth, and does not execute the deceleration control when the predicted speed vp is equal to or higher than the threshold value vpth. After that, the CPU sets the likelihood LH (threshold value vpth) such that the likelihood LH (threshold value vpth) at the time when the light color of the traffic light S is "yellow" is smaller than the likelihood LH (threshold value vpth) at the time when the light color of the traffic light S is "red." Thus, the state in which the predicted speed vp is higher than the threshold value vpth tends to be more likely to occur when the light color is "yellow" than when the light color is "red." That is, the deceleration control is less likely to be executed when the light color is "yellow" compared with the case in which the light color is "red." Thus, according to the at least one embodiment, it is possible to suppress excessive execution of deceleration control in the dilemma zone.

Figure 6:
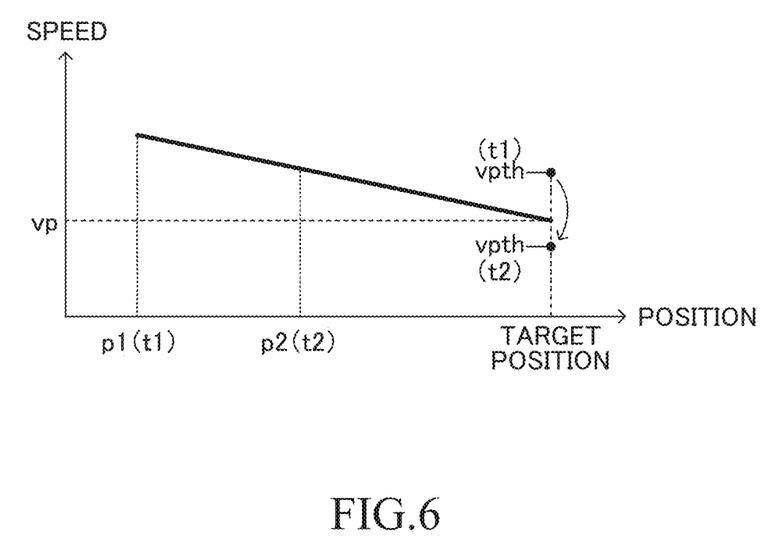
FIG. 6 is a graph for showing a process of gradually increasing a likelihood (threshold value).

Further, the CPU gradually increases the likelihood LH (threshold value vpth) from a time point t1 (position p1) at which the CPU recognizes that the light color is "yellow." For example, in an example of FIG. 6, the state transitions to the state in which the predicted speed vp is lower than the threshold value vpth (time point t2) when a certain time has elapsed since the state in which the predicted speed vp is higher than the threshold value vpth (time point t1). In this case, the deceleration control is not executed at the time point t1 at which the light color is recognized as "yellow," but the deceleration control is executed at the time point t2 (position p2) immediately before the light color transitions to "red." With this configuration, the execution of the deceleration control is started shortly before the light color of the traffic light S transitions to "red," and hence safety of the vehicle is further increased. In the example of FIG. 6, the predicted speed vp is assumed to be constant for the convenience of simple description. However, the predicted speed vp may fluctuate in the process in which the own vehicle approaches the traffic light S.

Moreover, when the direction indicator indicates the "right turn" ("left turn"), and the own vehicle is positioned on a right turn lane (left turn lane) or at a right end (left end) of the lane, the CPU increases the likelihood LH (threshold value vpth). Thus, the predicted speed vp tends to become lower than the threshold value vpth. As a result, the own vehicle is decelerated, and hence the driver can safely turn the own vehicle right (left).

The present invention is not limited to the at least one embodiment described above, and various modification examples can be adopted within the scope of the present invention as described below.

Modification Example 1

As described above, the CPU refers to the first database DB1 to preliminarily determine the likelihood LH, and then subtracts the correction value from the likelihood LH when the light color is "yellow." In this case, the correction value (first collection value) at the time when the light color of the traffic light S changes from "green" to "yellow" and the collection value (second correction value) at the time when a state in which the light color is "red" and an arrow lamp device is turned on changes to a state in which the light color is "yellow" may be different from each other. For example, the first correction value may set to be larger than the second correction value.

Modification Example 2

Figure 7:
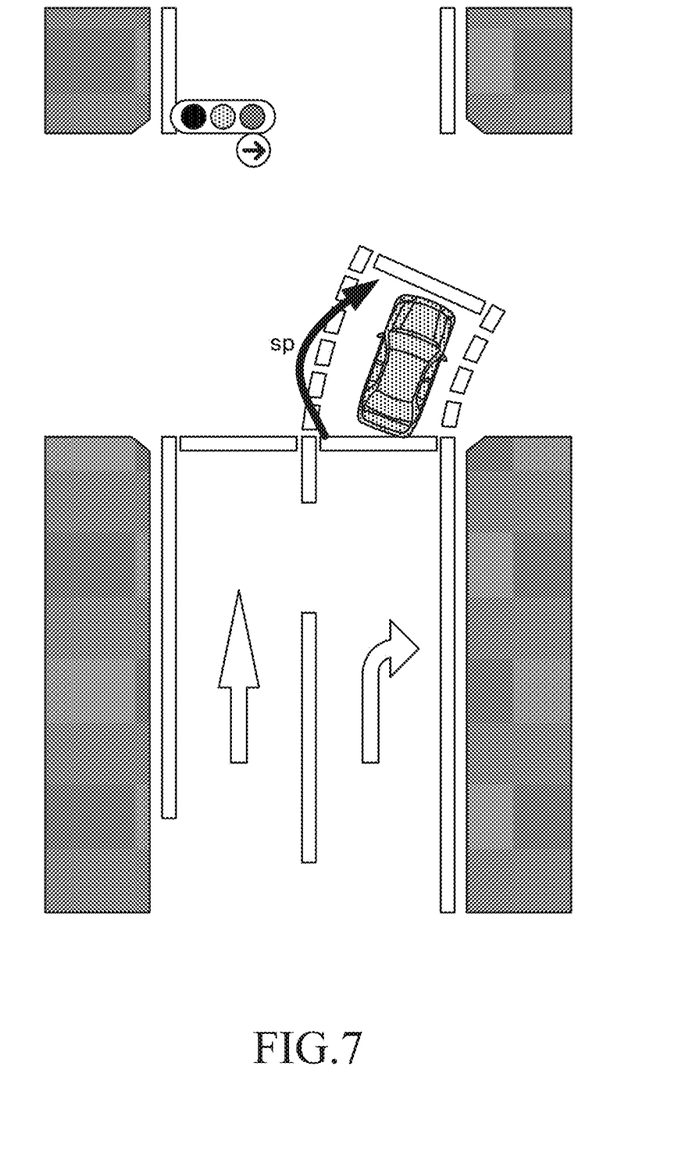
FIG. 7 is a plan view for illustrating an example in which a target position is changed.

As illustrated in FIG. 7, the CPU may be configured to set, in principle, the target position sp to a stop line before the traffic light S (intersection). However, the CPU may shift the target position sp forward (to an inside of the intersection) when the CPU recognizes that the own vehicle has entered the right turn lane (left turn lane) based on the information acquired from the in-vehicle sensor 20.

Modification Example 3

In the at least one embodiment described above, the database DB is formed of the first database DB1 for preliminarily determining the likelihood LH in the situation in which the light color of the traffic light S is "red or yellow," and the second database DB2 for correcting the likelihood LH when the light color of the traffic light S is "yellow." In place of those databases, there may be employed a third database DB3 (see FIG. 8) which includes a plurality of likelihoods LH each corresponding to one of a plurality of types of situations in which the light color is "red," and a plurality of likelihoods LH each corresponding to one of a plurality of types of situations in which the light color is "yellow." With this configuration, the CPU can refer to the third database DB3 to acquire the likelihood LH corresponding to the lighting modes of the traffic light S. That is, compared with the case in which the likelihood LH is preliminarily determined and this likelihood LH is then corrected, the processing of determining the likelihood LH is simplified. In this case, the threshold value vpth is calculated through use of a calculation expression of FIG. 9.

Modification Example 4

Figure 8:
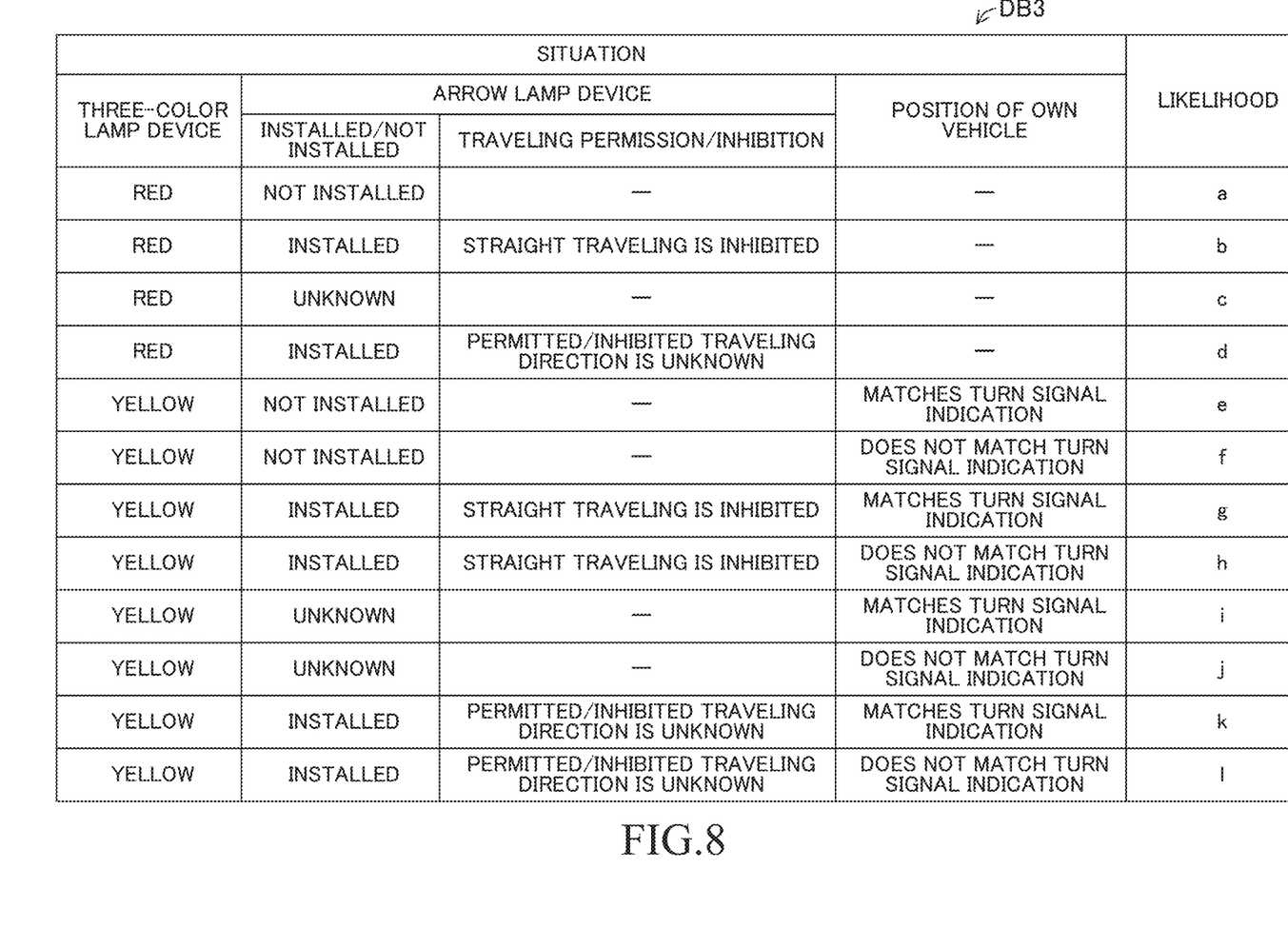
FIG. 8 is a table for showing a third database.
Figure 9:
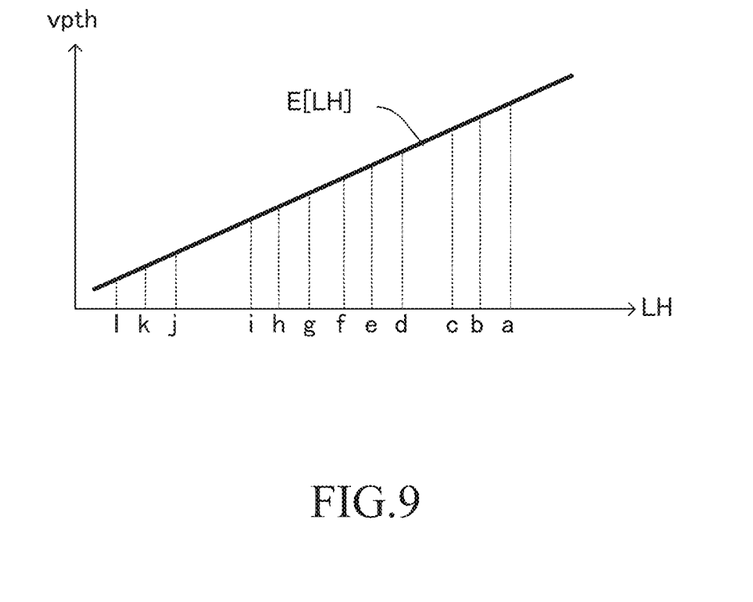
FIG. 9 is a graph for showing a calculation expression for calculating a threshold value corresponding to a likelihood determined based on FIG. 8.

The third database DB3 of FIG. 8 defines the relationship between the lighting modes of the traffic light S and the likelihood LH. However, in place of the third database DB3, there may be employed a fourth database DB4 which defines a relationship between the lighting modes of the traffic light S and the threshold value vpth. With this configuration, the CPU can refer to the fourth database DB4 to directly acquire the threshold value vpth corresponding to the lighting modes of the traffic light S. That is, compared with the case in which the CPU refers to the third database DB3 to determine the likelihood LH and then applies this likelihood LH to the calculation expression E to determine the threshold value vpth, the processing of determining the threshold value vpth is simplified.

Modification Example 5

In the at least one embodiment described above, when the predicted speed vp is equal to or higher than the threshold value vpth, the deceleration control is not executed. However, in place of this configuration, when the predicted speed vp is equal to or higher than the threshold value vpth, there may be executed slow deceleration control of decelerating the own vehicle relatively slowly (more slowly than in the case in which the predicted speed vp is lower than the threshold value vpth).

The vehicle V may be an autonomous vehicle.

What is claimed is:

1. A driving assistance device which is mounted to an own vehicle, comprising:
    a traffic light recognition device configured to recognize a lighting mode of a traffic light existing in front of the own vehicle; and
    a control device configured to determine a predetermined position in a periphery of the traffic light as a target position when the lighting mode of the traffic light recognized by the traffic light recognition device is a predetermined mode, execute deceleration control of decelerating the own vehicle until the own vehicle reaches the target position, calculate a predicted speed being a speed of the own vehicle at a time point at which the own vehicle reaches the target position in a case in which the own vehicle is decelerated from a current time point in a predetermined deceleration mode, execute the deceleration control in a first situation in which the predicted speed is lower than a threshold value determined based on the lighting mode of the traffic light, and to perform one of avoiding executing the deceleration control or executing slow deceleration control of decelerating the own vehicle more slowly than in the first situation in a second situation in which the predicted speed is equal to or higher than the threshold value,
    wherein the threshold value at a time when a light color of the traffic light is yellow is smaller than the threshold value at a time when the light color of the traffic light is red.

2. The driving assistance device according to claim 1, wherein the control device is configured to increase the threshold value as an elapsed time since the traffic light recognition device recognizes that the light color is yellow increases.

3. The driving assistance device according to claim 2, wherein the control device is configured to increase the threshold value when the light color of the traffic light is yellow, a direction indicator of the own vehicle is operating, and the own vehicle has entered a dedicated lane for turning toward a direction indicated by the direction indicator.

4. The driving assistance device according to claim 2, wherein the control device is configured to increase the threshold value when the light color of the traffic light is yellow, a direction indicator of the own vehicle is operating, and the own vehicle is positioned in, of both end portions in a width direction of a road on which the own vehicle is traveling, an end portion which is located in a direction indicated by the direction indicator.

5. The driving assistance device according to claim 1, wherein the control device is configured to increase the threshold value when the light color of the traffic light is yellow, a direction indicator of the own vehicle is operating, and the own vehicle has entered a dedicated lane for turning toward a direction indicated by the direction indicator.

6. The driving assistance device according to claim 1, wherein the control device is configured to increase the threshold value when the light color of the traffic light is yellow, a direction indicator of the own vehicle is operating, and the own vehicle is positioned in, of both end portions in a width direction of a road on which the own vehicle is traveling, an end portion which is located in a direction indicated by the direction indicator.

7. A driving assistance method which is applied to an own vehicle, comprising:
    a traffic light recognition step of recognizing a lighting mode of a traffic light existing in front of the own vehicle; and
    a control step of determining a predetermined position in a periphery of the traffic light as a target position when the lighting mode of the traffic light recognized in the traffic light recognition step is a predetermined mode, executing deceleration control of decelerating the own vehicle until the own vehicle reaches the target position, calculating a predicted speed being a speed of the own vehicle at a time point at which the own vehicle reaches the target position in a case in which the own vehicle is decelerated from a current time point in a predetermined deceleration mode, executing the deceleration control in a first situation in which the predicted speed is lower than a threshold value determined based on the lighting mode of the traffic light, and performing one of avoiding executing the deceleration control or executing slow deceleration control of decelerating the own vehicle more slowly than in the first situation in a second situation in which the predicted speed is equal to or higher than the threshold value,
    wherein the threshold value at a time when a light color of the traffic light is yellow is smaller than the threshold value at a time when the light color of the traffic light is red.

8. A non-transitory storage medium storing a driving assistance program for causing a computer included in an own vehicle to execute:
    a traffic light recognition step of recognizing a lighting mode of a traffic light existing in front of the own vehicle; and
    a control step of determining a predetermined position in a periphery of the traffic light as a target position when the lighting mode of the traffic light recognized in the traffic light recognition step is a predetermined mode, executing deceleration control of decelerating the own vehicle until the own vehicle reaches the target position, calculating a predicted speed being a speed of the own vehicle at a time point at which the own vehicle reaches the target position in a case in which the own vehicle is decelerated from a current time point in a predetermined deceleration mode, executing the deceleration control in a first situation in which the predicted speed is lower than a threshold value determined based on the lighting mode of the traffic light, and performing one of avoiding executing the deceleration control or executing slow deceleration control of decelerating the own vehicle more slowly than in the first situation in a second situation in which the predicted speed is equal to or higher than the threshold value, wherein the threshold value at a time when a light color of the traffic light is yellow is smaller than the threshold value at a time when the light color of the traffic light is red.

* * * * *